UNITED STATES PATENT OFFICE.

ARTHUR C. SPENCER, OF WASHINGTON, DISTRICT OF COLUMBIA.

PROCESS OF MAKING CEMENT AND BY-PRODUCTS.

1,209,220.      Specification of Letters Patent.      Patented Dec. 19, 1916.

No Drawing.      Application filed May 18, 1912. Serial No. 698,192.

*To all whom it may concern:*

Be it known that I, ARTHUR C. SPENCER, a citizen of the United States, residing at Washington, in the District of Columbia, have invented certain new and useful Improvements in Processes of Making Cement and By-Products, of which the following is a specification.

This invention relates to processes of making cement and byproducts; and it comprises a method of making Portland cement clinker and recovering alkalis wherein a mixture composed of a rock carrying feldspathoid minerals, such as leucite, nephelite and the like, and the correct proportion of added limestone, or similar form of calcium carbonate, to make a mixture having alumina, silica and lime in the correct ratio for Portland cement, is heated in such a manner as to fume off alkali, such alkali being recovered, and is finally converted into cement clinker; and it comprises, as a new composition of matter, a cement mix comprising comminuted rock carrying substantial proportions or leucite or nephelite, or both, and limestone in proportions suitable to give Portland cement clinker; all as more fully hereinafter set forth and as claimed.

In the manufacture of Portland cement clinker from ordinary clay and limestone, shale and limestone, argillaceous limestones or cement rock, etc., difficulties are presented by the fact that the silica of the mixture is never all in the combined state. Under the conditions prevailing in the rotary cement kiln, while silica in the form of silicates readily combines with lime, the same is not the case with free silica; that is, silica in the form of quartz or sand. Free silica combines with lime less easily as compared with silica already in a state of combination. With the usual mixtures therefore, there is always the risk of leaving some of the silica which may be desired in the mixture in the uncombined state where it functions merely as sand, and at the same time of producing cement of incorrect composition; or, on the other hand, in the effort to produce complete union of all the silica present to form clinker, the materials may be so overheated as to injure the quality of the clinker. Free silica is present in all clays and slates. Clays and slates are usually derived, directly or indirectly, from feldspathic rocks, such as granite, gneiss, etc.; that is, from rocks which contain an excess of silica.

Granite, gneiss and the like are rocks which have been formed in the presence of an excess of silica. Both rocks consist, substantially, of a mixture of feldspar, mica or hornblende and free silica; silica in the form of quartz. The alkali feldspars contain combined silica in the largest molecular proportions of any natural minerals. In weathering, the alkalis go into solution largely and are carried away from the other constituents. Therefore, with shales and clays derived from the weathering of acidic rocks there is for cement purposes, an excess of silica present in the uncombined state, and furthermore the ratio of silica to alumina is unduly high.

For most purposes, clays, slates and shales, taking free and combined silica together, may be said to have the composition of granite or gneiss minus a considerable proportion of the alkalis. They are, or have been largely produced by the weathering of common feldspar, a mineral which, in an unweathered and undecomposed state, is a frequent component. As regards the ratio of silica to alumina, this is at least equal to that in feldspar (orthoclase) and is ordinarily much higher, being the higher the more of the quartz of the original rock remains as sand in admixture with the clay. However, assuming that the silica-alumina ratio is no higher than that of orthoclase, this is still too high for cement clinker of the type usually desired, the percentage of silica divided by the percentage of alumina giving a quotient greater than 3. And, as stated, in the clay much of this silica is in the free state.

In the present invention, I have devised a method of making clinker which obviates the foregoing difficulties. In lieu of securing the alumina and silica necessary for Portland cement from clays and slates which, as pointed out, are relatively high in silica and invariably contain free silica (sand and the like) I use to furnish the silica and alumina certain rocks of the type which is now called "feldspathoid" by geologists and mineralogists, these rocks being characterized by the presence of the feldspathoid minerals, leucite, nephelite and the like. The feldspathoid minerals (*Introduction to Mineralogy*, W. B. Scott, 1898, page 17) are closely related to the feldspars but differ in crystalline form. They do not contain the excess of silica characterizing the feldspars.

Unlike the feldspars, the feldspathoid minerals are not commonly found in rocks or rocky materials carrying an excess of free silica; and this is recognized as the differentiating line between the two classes of rocks. A rock characterized by the occurrence therein of feldspathoid minerals does not contain free silica. Furthermore the feldspathoid minerals, such as leucite, nephelite and the like, differ from the potash feldspars in that the latter contain at least 50 per cent. more silica (figured molecularly) than the former. Like the feldspars, orthoclase and albite, they may be considered as double silicates of a sesquioxid base (alumina) and of an alkali, but contain less silica than the feldspars. Ordinarily, they carry both soda and potash as the alkaline constituent, with the potash predominating. Rocks carrying these feldspathoid minerals and characterized by their presence, are of the same general composition and they normally carry no free silica.

I have discovered that by making a suitable mixture of a finely comminuted rock carrying feldspathoid minerals with limestone, the two being in the correct proportions to give the silica:alumina:lime ratio of Portland cement, I can produce a good and uniform clinker, attaining certain advantages in the operation without encountering the complications and exercising the care necessary in using shale and slate. Incidentally, moreover, I can pay much of the cost of operation by the recovery of the potash which may be fumed off in preparing the cement. In rocks carrying leucite, the ratio of silica to alumina is ordinarily such that low alumina, slow setting, cement will result from their use; and both alumina and silica being in chemical union in the rock and in the presence also of alkalis which have fluxing properties, their transposition to form the characteristic bodies of Portland cement is ready and easy. Rocks carrying nephelite, such as nephelite syenite, are relatively rich in alumina and are well adapted to produce high alumina, quick setting cements, as are rocks carrying leucite. Either type of rocks, that is those that contain leucite as a characteristic constituent, or those carrying nephelite as a characteristic constituent, may be used in the present invention. For example, a typical nephelite, syenite, from Magnet Cove, Ark., may run 22 per cent. $Al_2O_3$, 4.5 per cent. $Fe_2O_3$ and 59 per cent. $SiO_2$. All the silica in this rock is in a combined state, as is the alumina. It will be seen that the ratio of silica to sesquioxids is not much over 2:1. This is a good ratio for a sound, quick setting Portland cement. Assuming that Portland cement carries 61 per cent. lime, it will be obvious that by adding the correct proportion of lime to a rock of this character, the following approximate analysis after removing the alkalis will be obtained: $SiO_2$, 26.8; $Al_2O_3$, 10.0; $Fe_2O_3$, 2.0; and CaO, 61.—a total of 99.8. This is a good Portland cement clinker.

Apart from the fact that these nephelite rocks furnish silica and alumina (or iron oxid) in combined forms and in a good ratio for cement purposes, their use is desirable because of several other considerations. For one thing, the large amount of alkali present acts as a flux, bringing about a preliminary union and causing a sintering to take place at a comparatively low temperature and with much more readiness than is the case with the relatively slowly reacting components of the ordinary cement mixes. In their presence there is no possibility of silica becoming or remaining uncombined to give ultimately clinker of incorrect composition. The mix of a nephelite rock with limestone begins to sinter and give a preliminary union at a low temperature and as the temperature rises the alkalis volatilize and escape while the combinations gradually change to those of cement clinker, ultimately giving a good clinker practically free of alkali. The alkali fumes may conveniently be collected and recovered, giving a valuable byproduct to help pay the cost of operation.

A mixture of nephelite syenite and limestone gives the greatest amount of alkali that can be obtained in a cement mixture from common rocks and at the same time the least amount of uncombined silica; practically none. It also gives the lowest silica:alumina ratio. Taking for comparison a mixture made from pure orthoclase (which is, commercially speaking, a rare material), if proportioned to yield a normal clinker, the cement batch will contain the proportions of 23 parts $SiO_2$, 6.8 $Al_2O_3$, 6.1 $K_2O$ and 70.2 parts CaO (128 parts limestone). The batch will then contain 3.7 per cent. alkali. After expelling the $K_2O$, the clinker will contain 23 per cent. $SiO_2$, 6.8 per cent. $Al_2O_3$, and 70.2 per cent. CaO. On the other hand, an averaged analysis of nephelite syenites from Arkansas may give 55.2 $SiO_2$, 21.1 $Al_2O_3$, 4.0 $Fe_2O_3$, 7.43 $K_2O$, 7.46 $Na_2O$ and 2.00 CaO. With this material, to obtain a clinker carrying the same silica (23 per cent.) only 65.0 parts of lime need be added. The batch will run 4.0 per cent. alkali, and the ratio of silica to sesquioxid in the final clinker instead of being as 23:6.8, will be as 23:10.4. This heightening of the sesquioxid ratio is valuable in making sound quick setting cement. Other material of the same sort but lower in silica content may be used to still further raise the percentage of alkali in the raw mixture, it being possible to thus obtain as high as 4.5 per cent. of total potash and soda.

The high proportion of alkali is not only economically important as increasing the amount of alkali recoverable from a given charge but also as increasing, for reasons stated, the easy sintering of the mixture and the manufacture of clinker. Its presence causes the operation of clinkering to be modified to the extent that a more gradual heating up to the final clinkering temperature is both possible and advisable. The clinker finally obtained contains no important amount of alkali.

The rocks I employ for the present purposes may be any of those containing nephelite minerals as characteristic ingredients, such as nephelite syenite, nephelite basalt, analcite basalt, and the like.

As before stated, leucite and leucite bearing rocks are also suitable materials for the present purposes. A typical leucite rock may carry 11 per cent. $K_2O$, 12 per cent. $Al_2O_3$, 7 per cent. $Fe_2O_3$ and 56 per cent. silica, the silica being substantially all in combination with the bases. Adding the proper amount of lime in the form of limestone or otherwise to give 65 per cent. lime in the clinker, the clinker will have approximately the following analysis: $SiO_2$, 24.5; $Al_2O_3$, 5.5; $Fe_2O_3$, 3.0; CaO 65.0; total 97.5 per cent.; the remainder being accounted for by other constituents present in the raw materials. A cement of this analysis sets somewhat less rapidly than that made from nephelite rocks. Leucite rocks of other analyses are of course suitable for the purposes of the present invention, the foregoing example being merely typical.

A wide variety of syenites, traps and basalts characterized by the presence of leucite-like minerals or nephelite-like minerals, may be used in the present invention. Where either leucite or nephelite is present in substantial quantities, the rock does not carry more than small quantities of uncombined silica.

In the present invention, the rock may be ground or comminuted in any desired way and admixed, with similarly ground limestone, or its equivalents, marl, shells, etc. The mixture may be either dry or wet, as in making slurry. It is usually undesirable to admix any proportion of slate or clay with this mixture, though the alkali of the feldspathoid rocks is capable of fluxing considerable amounts of these materials. The mixture may be advanced through an inclined rotary kiln, or a succession of such kilns, (with separate or common firing means) as a thin traveling stream passing under an overlying current of flame and flame gases. Advantageously, the period of exposure to the heat should be rather more prolonged than in the ordinary methods of making cement from slate and the like, but this lengthened exposure should be at a relatively low temperature. This is for the purpose of the preliminary sintering and of fuming off the alkalis, which go forward with the kiln dust and gases and may be collected therefrom in any desired way. This prolongation of the exposure to heat should be at a temperature somewhat below that adopted for ultimate clinkering. One of the advantages of the present invention is that the temperature of clinker formation need not be prolonged in the effort to cause free silica to unite with the bases, but a prolonged exposure to a lower temperature is in no way disadvantageous; and on the other hand is advantageous both because the alkalis may be economically regained by fuming them off in this way and because the alkali is thereby removed from the cement. As a rule, one part of the rock should be admixed with about 2.5 parts of some form of calcium carbonate. The limestone or other form of calcium carbonate used should be reasonably free from magnesia, not containing over five per cent., and should be free from sand and the like.

With material bearing nephelite or leucite containing considerable mica, I have found that a preliminary heating or roasting of the material is a considerable aid to the complete comminution of this flaky mineral constituent. While the rock may be heated alone to a temperature adequate for driving off the constituent water of the mica I have found it to be an advantage to perform this operation after mixing the rock and limestone. A convenient procedure is to crush the batch components, but not to reduce them to powder. The gravelly material is brought to a temperature adequate for calcination of the limestone which is also adequate to dehydrate the mica. The calcined material is then reduced to a fine powder suitable for the fuming and clinkering operations. An advantage of this procedure is that there is a great reduction of the amount of mineral dust in the gases from the clinkering operation, and the alkali fume can thus be readily collected in a purer state than would be otherwise possible. Another procedure sometimes convenient is to crush the materials containing mica and then remove the mica by screening or otherwise, finally mixing the materials partially freed from mica with limestone and proceeding as before.

Where a high silica:alumina ratio is desired, with certain nephelite rocks which have an extraordinarily low ratio of silica to alumina, it is sometimes desirable to employ silicious limestone in the batch or to introduce feldspathic material in addition to the nephelite rock and limestone. On the other hand, with leucite rocks having an unusually high silica:alumina ratio, aluminous materials may be added to the batch to reduce the ratio.

The dust or fumiform products of the furnace or kiln may be taken up in suspension by the gases which pass therethrough. These products may be collected by means of a flue and passed through settling chambers or dust catchers which may be of any convenient type. It is advantageous to provide water cooled surfaces within the chambers to promote the desired settling of the potassiferous fume. Of course gas washers of different types may be employed to effect the separation of the potash product from the gases which carry it out of the kiln.

I do not describe apparatus for carrying out my process as it is sufficiently obvious that many types of furnaces or kilns may be adapted for the treatment here described. If certain types of kilns are used, it will be necessary to form the materials of the batch into briquets prior to the heat treatment, but this procedure which, for reasons stated, is little advantageous, cannot constitute a departure from my invention which resides in the advantageous constitution of the charge-batch, permitting evolution of alkali at a relatively low temperature, reducing the required consumption of fuel, and permitting the ready collection of the alkali products.

In working the mixture in a rotary kiln it is advisable to have the gases leave the kiln at a temperature above, say, 500° C., and remain around this temperature for some time since the alkali fume will then remain in suspension after a good part of the coarser batch-dust has settled out. The alkali fume thus becomes more concentrated and on losing heat condenses so that it may be precipitated and recovered as a richer product than is possible where a lower temperature is attained at or just beyond the kiln exit. While the desirable temperature may be readily maintained in working with a single kiln it is obvious that a double kiln setting offers certain advantages in the way of enabling a close control of the temperature at which the fume-bearing gases make their exit. The cement clinker produced in any of these ways is collected in the usual manner, cooled, ground and converted into cement of commercial grade.

It is sometimes advantageous to perform the operation of clinkering in a manner calculated to expel potash more completely than soda. This can be readily accomplished since at high temperatures, in the presence of lime, potash is more readily dissociated from silicate combination than is soda. The latter alkali forms various silicate compounds in company with lime whereas potash does not readily enter into similar association.

What I claim is:—

1. In the manufacture of cement clinker and byproducts, the process which comprises making a mixture in cement-forming proportions comprising comminuted limestone with comminuted rock carrying nephelite minerals and having a lower ratio of silica to alumina than characterizes orthoclase.

2. In the manufacture of cement clinker and byproducts, the process which comprises making a mixture in cement-forming proportions comprising comminuted limestone and comminuted rock carrying nephelite minerals and having a lower ratio of silica to alumina than characterizes orthoclase, heating said mixture to fume off alkalis and converting the residue into cement clinker.

3. In the manufacture of cement clinker and byproducts, the process which comprises making an alkali-rich mixture adapted to form cement clinker and comprising comminuted limestone and comminuted nephelite-bearing rock, passing the same through a rotary kiln against flame and flame gases till a desired proportion of alkalis is removed and then raising the heat to form cement clinker.

4. In the manufacture of cement clinker and byproducts, the process which comprises making a mixture comprising cement-forming proportions of a comminuted rock carrying nephelite minerals and mica with granulated limestone, roasting the mixture to calcine the lime and dehydrate the mica, fine-grinding, heating to fume off alkalis and converting the residue into cement clinker.

5. In the manufacture of cement clinker and byproducts, the process which comprises making a mixture in cement-forming proportions comprising comminuted limestone with comminuted nephelite syenite.

6. In the manufacture of cement clinker and byproducts, the process which comprises making a mixture in cement-forming proportions comprising comminuted limestone and comminuted nephelite syenite, heating said mixture to fume off alkalis and converting the residue into cement clinker.

7. In the manufacture of cement clinker and byproducts, the process which comprises making a mixture in cement-forming proportions comprising comminuted limestone and of comminuted nephelite syenite, passing the same through a rotary kiln against flame and flame gases till a desired proportion of alkalis is removed and then raising the heat to form cement clinker.

8. In the manufacture of cement clinker and byproducts, the process which comprises making a mixture in cement-forming proportions comprising a nephelite syenite and mica with granulated limestone, roasting the mixture to calcine the lime and dehydrate the mica, fine-grinding, heating to fume off alkalis and converting the residue into cement clinker.

9. As a new composition of matter, a mixture of comminuted rock carrying nephelite minerals and having a lower ratio of silica to alumina than characterizes orthoclase with comminuted limestone, said mixture being in proportions to give a cement clinker.

10. As a new composition of matter, a mixture of comminuted nephelite syenite with comminuted limestone, said mixture being in proportions to give a cement clinker.

11. In the manufacture of cement clinker and byproducts, the process which comprises making an alkali-rich mixture adapted to form cement clinker and comprising comminuted rock carrying feldspathoid minerals and comminuted limestone.

12. In the manufacture of cement clinker and byproducts, the process which comprises making a mixture in cement-forming proportions comprising comminuted limestone and comminuted rock carrying feldspathoid minerals and having a lower ratio of silica to alumina than characterizes orthoclase, heating said mixture to fume off alkalis and converting the residue into cement clinker.

13. In the manufacture of cement clinker and byproducts, the process which comprises making a mixture in cement-forming proportions comprising comminuted limestone and of comminuted rock carrying feldspathoid minerals and having a lower ratio of silica to alumina than characterizes orthoclase, passing the same through a rotary kiln against flame and flame gases till a desired proportion of alkalis is removed and then raising the heat to form cement clinker.

14. As a new composition of matter, a mixture of comminuted rock carrying substantial quantities of feldspathoid minerals and having a lower ratio of silica to alumina than characterizes orthoclase with comminuted limestone, said mixture being in proportions to give a cement clinker.

15. The process of making cement clinker which comprises mixing with basic calcareous material natural silicate material of the feldspathoid type containing alumina and substantially free of uncombined silica or uncombined alumina and having a lower ratio of silica to alumina than characterizes orthoclase, and clinkering the mixture.

In testimony whereof, I affix my signature in the presence of two subscribing witnesses.

ARTHUR C. SPENCER.

Witnesses:
K. P. McElroy,
R. F. Steward.